(12) United States Patent
Dutil et al.

(10) Patent No.: US 9,777,806 B2
(45) Date of Patent: Oct. 3, 2017

(54) SEALED BELT TENSIONING DEVICE

(75) Inventors: Kevin G. Dutil, Bentonville, AR (US); Anthony E. Lannutti, Fayetteville, AR (US); James Kevin Lindstrom, Springdale, AR (US)

(73) Assignee: Dayco IP Holdings, LLC, Troy, MI (US)

( * ) Notice: Subject to any disclaimer, the term of this patent is extended or adjusted under 35 U.S.C. 154(b) by 686 days.

(21) Appl. No.: 13/432,548

(22) Filed: Mar. 28, 2012

(65) Prior Publication Data
US 2013/0260933 A1 Oct. 3, 2013

(51) Int. Cl.
F16H 7/12 (2006.01)
F16H 7/08 (2006.01)

(52) U.S. Cl.
CPC ..... F16H 7/1218 (2013.01); *F16H 2007/081* (2013.01); *F16H 2007/0893* (2013.01)

(58) Field of Classification Search
CPC ....... F16H 2007/081; F16H 2007/0893; F16H 2007/084; F16H 7/1218; F16H 7/1281
USPC ................................................. 474/135, 133
See application file for complete search history.

(56) References Cited

U.S. PATENT DOCUMENTS

| | | |
|---|---|---|
| 3,759,146 A | 9/1973 | Brotherton |
| 4,723,934 A | 2/1988 | Thomey |
| 4,728,317 A | 3/1988 | Martz et al. |
| 4,832,666 A | 5/1989 | Henderson |
| 4,911,680 A | 3/1990 | Kodama et al. |
| 4,938,735 A | 7/1990 | Mitchell et al. |
| 5,004,449 A | 4/1991 | Ojima |
| 5,234,384 A | 8/1993 | Shibata et al. |
| 5,259,628 A | 11/1993 | Nisley |
| 5,312,302 A | 5/1994 | Yamamoto |
| 5,354,242 A | 10/1994 | St. John |
| 5,462,494 A | 10/1995 | Rogalla |
| 5,632,697 A | 5/1997 | Serkh |
| 5,718,649 A | 2/1998 | Hong et al. |
| 5,803,849 A | 9/1998 | Ayukawa |
| 5,803,850 A | 9/1998 | Hong et al. |

(Continued)

FOREIGN PATENT DOCUMENTS

| | | |
|---|---|---|
| CN | 1144892 | 3/1997 |
| CN | 1166157 | 11/1997 |

(Continued)

OTHER PUBLICATIONS

International Search Report and Written Opinion, PCT/US2013/033395 (May 30, 2013).

(Continued)

*Primary Examiner* — Michael Riegelman
(74) *Attorney, Agent, or Firm* — FisherBroyles, LLP; Susan M. Oiler

(57) ABSTRACT

A tensioning system including a base and an arm pivotally coupled to the base, the arm having an engagement surface and being configured to pivot relative to the base about a pivot axis. The system further includes a biasing mechanism operatively coupled to the arm to bias the arm relative to the base, and a seal assembly sealingly positioned between the arm and the base. The seal assembly is coaxial with the pivot axis and configured to accommodate relative axial movement between the base and the arm and relative radial movement between the base and the arm while still maintaining a seal therebetween.

37 Claims, 6 Drawing Sheets

(56) References Cited

U.S. PATENT DOCUMENTS

| | | | |
|---|---|---|---|
| 5,964,674 A * | 10/1999 | Serkh et al. | 474/109 |
| 6,264,578 B1 | 7/2001 | Ayukawa | |
| 6,575,860 B2 | 6/2003 | Dutil | |
| 6,855,079 B2 | 2/2005 | Cura et al. | |
| 6,857,979 B2 | 2/2005 | Macnaughton et al. | |
| 6,884,194 B2 | 4/2005 | Meckstroth | |
| 7,094,168 B2 | 8/2006 | Tanaka | |
| 7,186,196 B2 | 3/2007 | Quintus | |
| 7,448,974 B2 | 11/2008 | Crist et al. | |
| 7,497,796 B2 | 3/2009 | Ordo et al. | |
| 7,678,002 B2 | 3/2010 | Joslyn | |
| 7,837,582 B2 | 11/2010 | Smith et al. | |
| 7,883,436 B2 | 2/2011 | Mosser et al. | |
| 7,887,445 B2 | 2/2011 | Quintus et al. | |
| 7,901,140 B2 | 3/2011 | Petri | |
| 8,075,433 B2 | 12/2011 | Quintus et al. | |
| 8,277,348 B2 * | 10/2012 | Lannutti | 474/135 |
| 8,529,387 B2 * | 9/2013 | Lannutti et al. | 474/74 |
| 8,545,352 B2 * | 10/2013 | Lannutti et al. | 474/135 |
| 2004/0185976 A1 * | 9/2004 | Meckstroth et al. | 474/101 |
| 2006/0217222 A1 | 9/2006 | Lolli et al. | |
| 2008/0119310 A1 | 5/2008 | Holcombe et al. | |
| 2009/0005202 A1 * | 1/2009 | Crist et al. | 474/135 |
| 2009/0286636 A1 | 11/2009 | Serkh et al. | |
| 2009/0291791 A1 | 11/2009 | Ward et al. | |
| 2010/0147646 A1 * | 6/2010 | Lannutti et al. | 192/41 S |
| 2010/0261564 A1 | 10/2010 | Hughes | |
| 2011/0015015 A1 | 1/2011 | Gresley | |
| 2011/0039648 A1 | 2/2011 | Lannutti et al. | |
| 2011/0207568 A1 | 8/2011 | Smith et al. | |
| 2011/0300976 A1 * | 12/2011 | Lannutti | 474/135 |
| 2013/0217525 A1 * | 8/2013 | Crist et al. | 474/111 |
| 2013/0260933 A1 * | 10/2013 | Dutil et al. | 474/135 |

FOREIGN PATENT DOCUMENTS

| | | |
|---|---|---|
| CN | 1495375 | 5/2004 |
| CN | 201339692 | 11/2009 |
| DE | 10 2005 03159 | 1/2007 |
| DE | 10 2006 05700 | 6/2008 |
| DE | 10 2007 05927 | 6/2009 |
| EP | 0364277 | 4/1990 |
| EP | 0678427 | 10/1995 |
| EP | 0967412 | 12/1999 |
| JP | 4300444 | 10/1992 |
| JP | H05-17252 | 3/1993 |
| JP | 2006-057743 | 3/2006 |
| WO | 94/02751 | 2/1994 |
| WO | 2011/018297 | 2/2011 |

OTHER PUBLICATIONS

English translation of JP 2006-057743 (published Mar. 2006), provided by the International Searching Authority with the International Search Report and Written Opinion.

English translation of WO 2011/018297 (published Feb. 2011), provided by the International Searching Authority with the International Search Report and Written Opinion.

CN, Second Office Action and Search Report (with English translation); Patent Application No. 201380017081.X (Sep. 5, 2016).

CN, Search Report (with English translation); Patent Application No. 201380017081X (Mar. 4, 2016).

CN, Office Action; Patent Application No. 201380017081X (Apr. 1, 2016).

EP, Supplementary European Search Report; Patent Application No. 13770364.1 (Mar. 4, 2016).

JP, Notice of Reasons for Rejection (with English translation); Japanese Patent Application No. 2015-503404; 20 pages (Feb. 20, 2017).

* cited by examiner

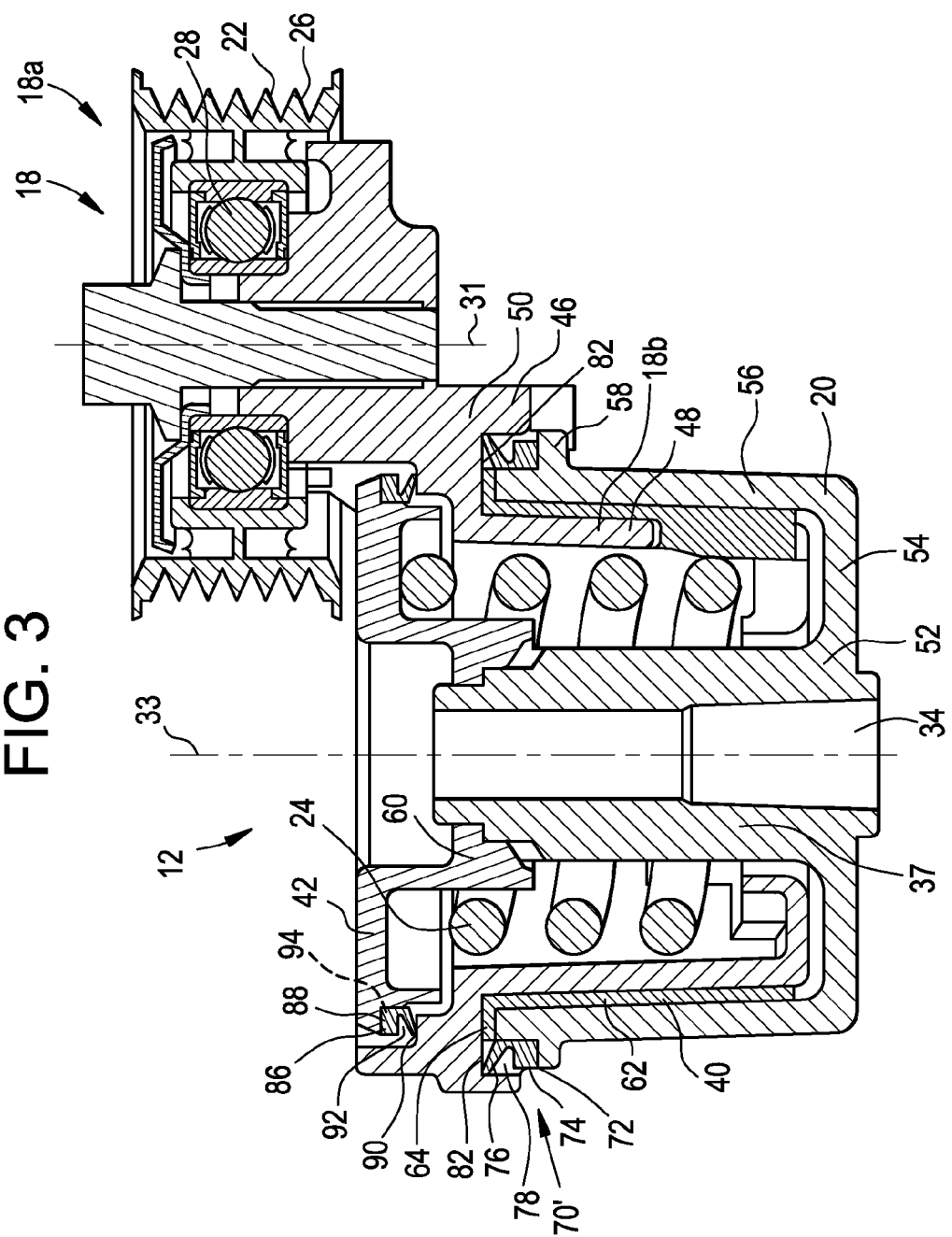

SEALED BELT TENSIONING DEVICE

The present invention is directed to a belt tensioning device, and more particularly, to a belt tensioning device with one or more seals incorporated therein.

BACKGROUND

Belt tensioners are utilized to ensure the associated belt, such as a belt in an automotive vehicle, is placed and maintained in the desired state of tension. Such belt tensioners can in some cases be exposed to environmental factors and outside contaminants, such as dust, dirt, fluids, etc. However, many existing belt tensioners do not provide sufficient protection from such environmental factors and outside contaminants.

SUMMARY

In one embodiment, the present invention is belt tensioning device incorporating one or more seals to protect the belt tensioning device from environmental factors and outside contaminants. More particularly, in one embodiment the invention is a tensioning system including a base and an arm pivotally coupled to the base, the arm having an engagement surface and being configured to pivot relative to the base about a pivot axis. The system further includes a biasing mechanism operatively coupled to the arm to bias the arm relative to the base, and a seal assembly sealingly positioned between the arm and the base. The seal assembly is coaxial with the pivot axis and configured to accommodate relative axial movement between the base and the arm and relative radial movement between the base and the arm while still maintaining a seal therebetween.

BRIEF DESCRIPTION OF DRAWINGS

FIG. 3 is a side cross section of an alternate tensioner;

DETAILED DESCRIPTION

Figure 1:
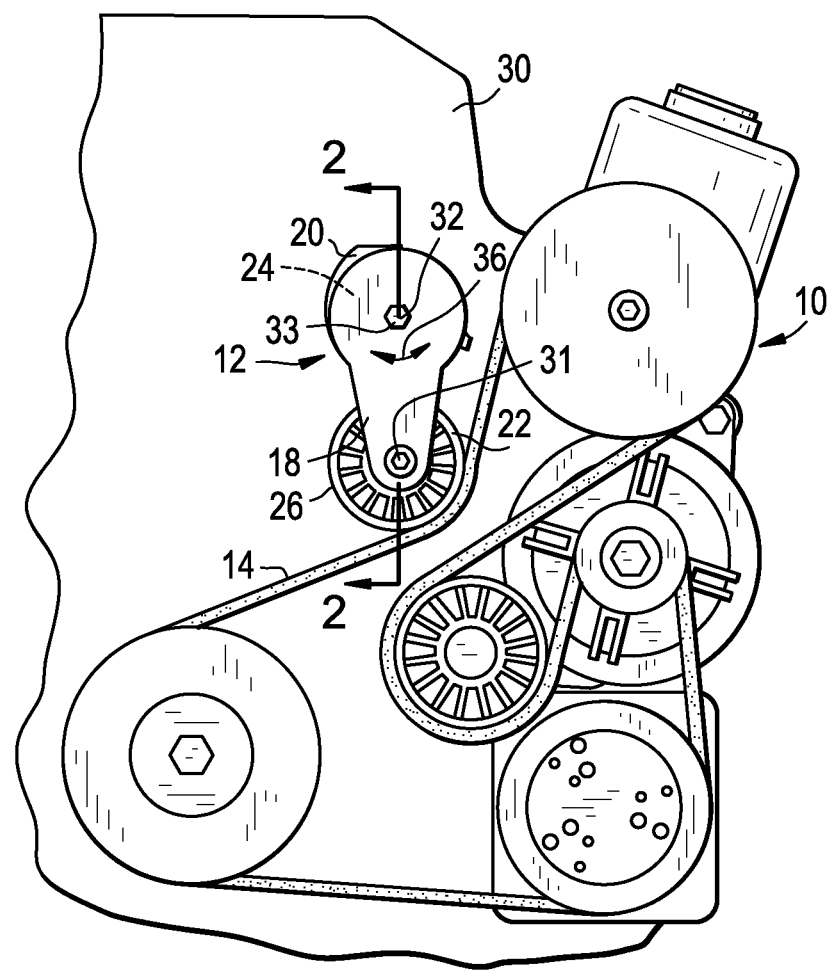
FIG. 1 is a front view of a belt system utilizing a tensioner.

FIG. 1 is a front view of a belt system, generally designed 10, shown in association with a belt tensioner 12. The belt system 10 includes an endless power transmitting element 14, such as a belt, chain or the like, which passes around a variety of pulleys, gears, guides. The power transmitting element 14 thereby drives a plurality of driven accessories, and/or is driven by one or more of the components. The power transmitting element 14 can, in one case, take the form of a timing belt/chain, a drive belt/chain, a transmission belt/chain or the like for use in an automotive vehicle. The tensioner 12 engages the power transmitting element 14 to apply the desired force to the power transmitting element 14 and to induce the desired tension.

Figure 2:
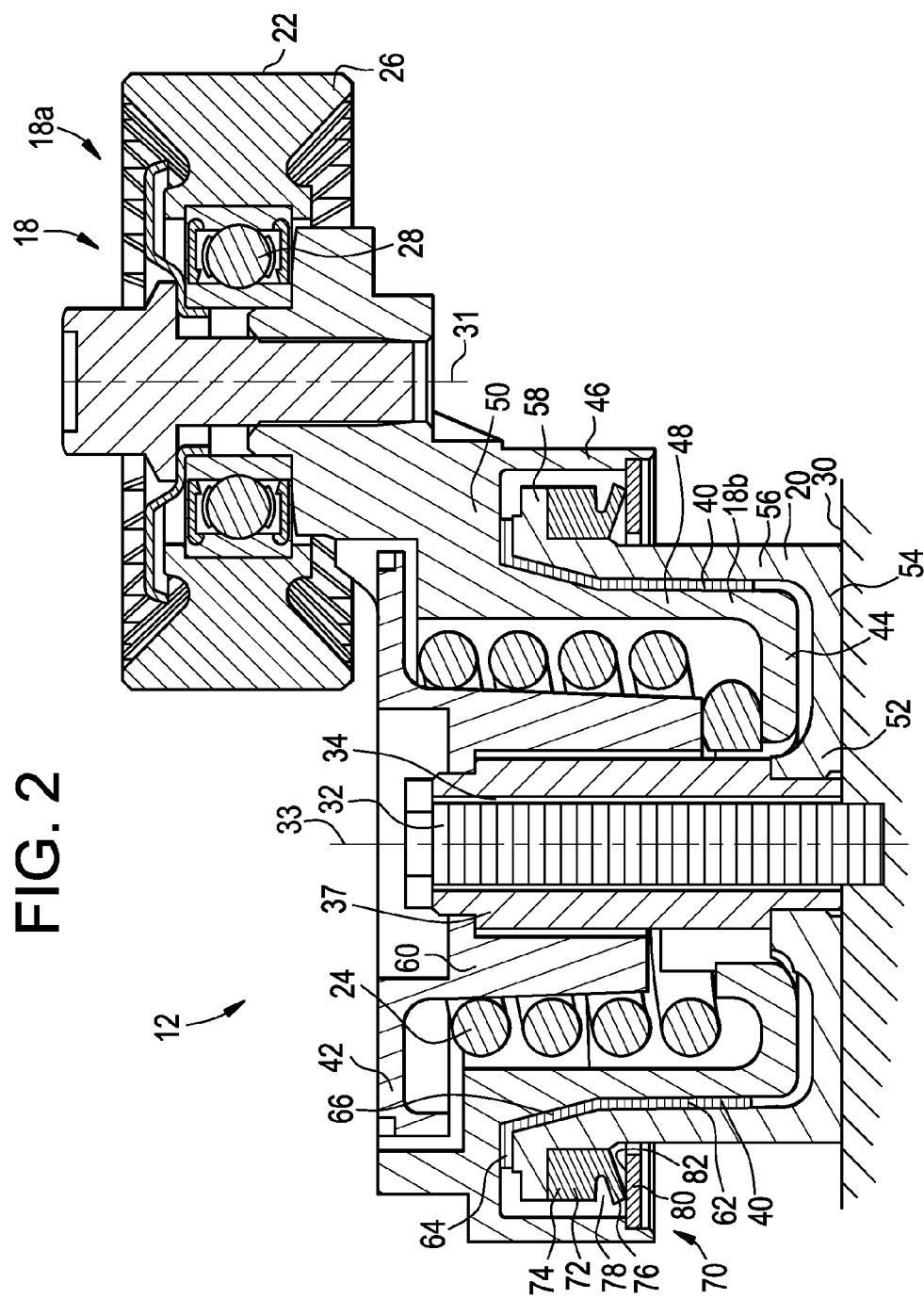
FIG. 2 is a side cross section of the tensioner of FIG. 1, taken along line 2-2.

With reference to FIGS. 1 and 2, the tensioner 12 includes an arm 18 movably coupled to a spring case or base 20. The tensioner 12 further includes a belt engagement surface 22 positioned at one end of the arm 18, and a biasing mechanism or energy storing device 24 positioned between and operatively engaging the arm 18 and spring case 20. In one embodiment, the belt engagement surface 22 takes the form of a generally cylindrical roller 26 rotatably coupled to the arm 18 via a bearing 28, as shown in FIG. 2, such that the roller 26 can rotate as the belt 14 rolls past the tensioner 12. Alternately the belt engagement surface 22 can take the form of a smooth, but non-rotatable, component with high-lubricity, or a toothed sprocket (for use with a chain), etc. The belt engagement surface 22 is aligned with, and/or rotatable about, an axis 31.

The arm 18 is pivotally coupled to the spring case 20, and the spring case 20 is configured to be fixedly and non-rotatably coupled to an anchor body 30, such as an engine, engine block, engine cover, frame, etc. In one embodiment the tensioner 12/spring case 20 is coupled to the anchor body 30 by a threaded fastener 32, such as a bolt, extending through a central opening 34 of a pivot tube 37 of the tensioner 12 and into the anchor body 30. The bolt 32 thereby defines, or is aligned with, an axis 33 about which the arm 18 is pivotable. The axis 33 is thus, in the illustrated embodiment, radially offset from the axis 31 of the belt engagement surface 22. The tensioner 12 could also be configured in and/or mounted in various other configurations and manners, such as in a tab/ear mounting configuration.

The biasing mechanism 24 can take the form of a spring, such as a helical coil spring in the illustrated embodiment. The biasing mechanism 24 urges the arm 18/roller 26 into contact with the belt 14 with the desired amount of force, and allows the arm 18 to pivot about the axis 33 (i.e. in the directions of the arrow 36 shown in FIG. 1) to accommodate varying forces applied to the arm 18/roller 26 by the belt 14. A bushing 40 is positioned between the arm 18 and the spring case 20, and a spring cap 42, or cover, is located at one axial end of the spring 24 to cover and protect the spring 24.

In the embodiment of FIG. 2, the arm 18 includes a pulley portion 18a carrying the roller 26 and a body portion 18b positioned adjacent to the spring case 20. The body portion 18b of the arm 18 includes a generally flat, center annular portion 44, a radially outer flange 46, and a radially inner flange 48 positioned between the center portion 44 and the outer flange 46 in the radial direction. The arm 18 also includes a connecting portion 50 positioned between the outer 46 and inner 48 flanges. The spring 24 is positioned adjacent to and radially inside the radially inner flange 48, and above and adjacent to the center portion 44.

The spring case 20 includes an inner cylindrical portion 52, an outer cylindrical portion 56 and a generally flat body portion 54 positioned between the inner cylindrical portion 52 and the outer cylindrical portion 56 in the radial direction. The outer cylindrical portion 56 includes an end flange 58 extending radially outwardly from an upper end thereof. The outer cylindrical portion 56 and the end flange 58 of the spring case 20 are positioned between the outer flange 46 and the inner flange 48 of the arm 18 in a radial direction thereof. In this manner various portions of the arm 18 and spring case 20 nest, or overlap, in the axial and/or radial directions.

The spring cap 42 is positioned at the upper, central end of the tensioner 12. The spring cap 42 includes an inner tube portion 60 which is positioned between the pivot tube 37 and the spring 24 such that the spring 24 is positioned between the inner tube portion 60/spring cap 42 and the radially inner flange 48 of the arm 18 in the radial direction.

One end of the spring 24 is fixedly coupled to the arm 18 (e.g. in one case to the radially inner flange 48, or connecting portion 50, or center portion 44 of the arm 18), and the other end of the spring 24 is fixedly coupled to the spring cap 42 (e.g. in one case to the inner tube portion 60 of the spring cap 42). The spring cap 42 is, in turn, fixedly coupled to the spring case 20 via the pivot tube 37. In this manner, when the arm 18 is pivoted (i.e. in the direction of arrows 36 of FIG. 1), the spring 24 is wound or unwound, depending upon the direction of pivoting, to provide the desired biasing force to the arm 18.

In the embodiment of FIG. 2, the bushing 40 is positioned between the arm 18 and the spring case 20. In the illustrated embodiment the bushing 40 includes a cylindrical portion 62 at one end thereof, a flange portion 64 at the other end thereof, and a generally conical portion 66 positioned between the flange portion 64 and the cylindrical portion 62. The cylindrical portion, or pivot bushing 62, helps to provide proper radial alignment between the arm 18 and spring case 20, and is positioned between the outer cylindrical portion 56 of the spring case 20 and the radially inner flange 48 of the arm 18. The flange portion of the bushing, or spring bushing 64, helps to provide proper axial alignment between the arm 18 and the spring case 20, and is positioned between the end flange 58 of the spring case 20 and the connecting portion 50 of the arm 18.

Finally, the conical portion of the bushing, or the damper bushing 66, provides damping characteristics to the tensioner 12, and can provide radial and/or axial positioning between the arm 18 and spring case 20, and is positioned between the outer cylindrical portion 56 of the spring case 20 and the radially inner flange 48 of the arm 18. The bushing 40 can be made from a wide variety of materials, but is made of plastic or polymer materials in one case. Further details relating to tensioners, which can utilize the seals disclosed herein, can be found in U.S. Pat. Nos. 7,497,796, 7,887,445, 8,075,433, and 6,575,860, the entire contents of which are incorporated herein.

In some cases environmental factors and outside contaminants, such as dust, dirt, fluids, etc. can penetrate the tensioner 12 and cause the bushing 40, or other components, to wear. Wearing of the bushing 40 or other components can adversely effect the performance of the tensioner 12. Therefore, in the embodiment of FIG. 2 a seal system 70 is provided to reduce the penetration of contaminants to the bushing or other components.

The illustrated seal system 70 includes a V-ring seal 72, or lip seal, having a body portion 74 and an integral, flexible flange 76. A gap 78 is positioned between the flange 76 and the body portion 74, and the flange 76 is relatively thin, and therefore deflectable, relative to the body portion 74. In the illustrated embodiment, the seal 72 is positioned on the radially outer surface of the outer cylindrical portion 56, and below the end flange 58 of the spring case 20.

The seal system 70 further includes a seal plate 80 that is coupled to the outer flange 46 of the arm 18, extending radially inwardly therefrom. The seal plate 80 can be secured to the outer flange 46/arm 18 by staking, but could also be secured by various means, such as welding, adhesives, brazing, etc. Alternatively, the seal plate 80 can be formed as a unitary one-piece body with the arm 18/outer flange 46.

Figure 3A:
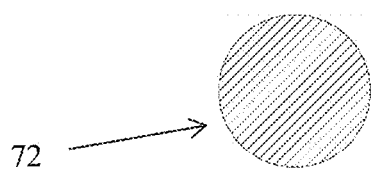
FIG. 3A illustrates an O-ring seal in cross section.
Figure 3B:
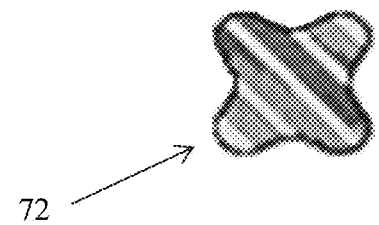
FIG. 3B illustrates an X-ring seal in cross section.
Figure 3C:
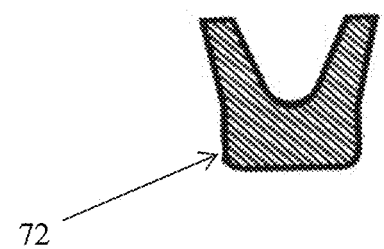
FIG. 3C illustrates a U-ring seal in cross section.

The upper surface 82 of the seal plate 80 defines a seal counterface which sealingly engages the flange 76 of the seal 72. In particular, the seal 72 and seal plate 80 are arranged such that the seal 72/flange 76 is placed into compression in the axial direction when the tensioner 12 is assembled/mounted to ensure proper sealing and allow for wear in the tensioner 12. The seal 72 may also be stretched/placed in tension in the radial direction by stretching the seal 72 to a greater diameter than the seal 72 assumes when it is not mounted to the tensioner 12. The seal 72 can be made of a wide variety of materials, such as rubber, synthetic rubber, a butyl material, a trial nitrile, etc. Moreover, the seal 72 can take a variety of configurations besides the V-ring seal shown herein, such as O-rings (FIG. 3A), X-rings (FIG. 3B) and U-rings (FIG. 3 C). The seal 72 may be relatively compressible but have the ability to accommodate relatively high tolerances and wear. In particular, it may be desired for the seal 72 to be compressible to allow some travel/movement, but not provide much resistance to such travel/movement. The V-ring seal provides a relatively high amount of travel (to allow for wear and tolerance) without much compressive force, thereby reducing temporary damping and damping variation from seal contact. However, other shapes can be utilized.

As the flange portion 64 of the bushing 40 wears, the axial position of the arm 18 relative to the spring case 20 can be shifted (typically, the arm 18 and spring case 20 on either side of the flange portion 64 move closer together in the axial direction). This shift in position causes the seal plate 80 to move axially away from the seal 72. In this case the seal 72/flange 76 simply expands in the axial direction, increasing its gland size, following the seal plate 80 and maintaining a proper seal. On the other hand, if the seal plate 80 were to move toward the seal 72 (for example, due to uneven wear of the bushing 40 causing canting or skewing of the arm 18 relative to the spring plate 20), the seal 72/flange 76 will be compressed, decreasing its gland size, and again maintaining a proper seal.

Therefore, the seal assembly 70 can accommodate a shift in axial position between the seal plate 80 and seal 72 in either axial direction. In this manner wearing of the bushing 40, and axial shifts in position between the arm 18 and spring case 20, are easily accommodated.

The seal assembly 70 can also accommodate wear in the cylindrical portion 62 of the bushing 40. In particular, such wear may cause the seal 72 to move radially inwardly or outwardly relative to the seal plate 80. In this case, however, the flange 76/seal 72 simply slides radially inwardly across the seal plate 80/counterface 82 to accommodate such a shift in position. The seal assembly 70 may have or provide radial clearance for the seal 72 on either side of the seal plate 80 to allow the seal 72/flange 76 to slide radially across the seal plate 80, while maintaining the seal. However, it should be noted that such radial movement of the seal 72 across the seal plate 80 is designed to accommodate wear, and is not necessarily designed to accommodate off-center or eccentric movement of the arm 18 relative to the spring case 20.

Wear of the conical portion 66 of the bushing 40 may cause the seal 72 to shift both axially and radially relative to the seal plate 80. As described above, however, the compressible/movable nature of the seal 72 enables the seal assembly 70 to accommodate such wear/movement. As also noted above, the bushing 40 or parts thereof may wear unevenly over time, which can cause the arm 18 to pitch, or form an angle, relative to the spring case 20. The flexible, dynamic nature of the seal assembly 70 therefore allows the seal assembly 70 to accommodate such pitching or offset of the arm 18.

The seal assembly 70 thereby maintains a seal around the bushing 40 to prevent contaminants, such as dust, dirt, fluids and other environmental factors from reaching the bushing 40, helping to ensure proper operation of the tensioner 12 and extending the life of the tensioner. The illustrated seal assembly 70 is also positioned radially outside the spring 24, isolating the spring 24 from the outside environment. The seal assembly 70 thus helps to protect the spring 24, extend its useful life, and ensuring proper operation of the tensioner 12.

In the illustrated embodiment, the seal 72/seal assembly 70 is concentrically/coaxially mounted relative to the bolt 32/axis 33. This arrangement helps to ensure that, under normal operating conditions, the seal 72 does not move in the radial direction relative to the seal counterface 82 whenever the arm 18 is pivoted relative to the spring case 20. In particular, repeated radial movement of the seal 72 relative to the seal counterface 82 could create a sweeping action that could lead to the introduction of contaminants inside the seal assembly 70, which could cause wear in the bushing 40 or other components, and could also cause wear in the seal 72 itself.

FIG. 2 illustrates the seal 72 in a particular arrangement in which the flange 76 of the seal 72 is positioned on the bottom side of the seal 72, engaging the seal plate 80. However, this configuration can be reversed such that the body 74 of the seal 72 is positioned adjacent to the seal plate 80, and the flange 76 of the seal 72 is positioned at the top, engaging the end flange 58 of the spring case 20. In this reversed configuration the seal assembly 70 can still accommodate axial and radial movement between the arm 18 and spring case 20 in all directions. Moreover, the seal 72 can be turned on its side in either direction thereof, such that the flange 76 faces either the outer cylindrical portion 56 of the spring case 20 or the radially outer flange 46 of the arm 18, while still maintaining a proper seal and accommodating relative axial and radial movements between the arm 18 and spring case 20. Thus, the seal 72 can be rotated 90°, 180°, or 270° from its position shown in FIG. 2.

FIG. 3 illustrates an alternate embodiment having a seal assembly 70' similar to that of FIG. 2 and described above. The tensioner 12 of FIG. 3 is somewhat similar to that of FIG. 2, but utilizes a pivot tube 37 formed as one piece with the spring case 20, and the spring 24 is an expansion spring which unwinds as the tensioner 12 moves from its free arm to its nominal position. Moreover, the spring cap 42 has an inner tube portion 60 with a shorter axial length than that in the embodiment of FIG. 2

In the embodiment of FIG. 3 the seal 72 is positioned above (instead of below) the end flange 58 of the spring case 20, and engages the underside of the connecting portion 50 of the arm 18. In this manner, the underside of the connecting portion 50 acts as the seal counterface 82 that the seal 72 flexibly and sealingly engages, providing the same benefits as described above in the embodiment of the FIG. 2. Moreover, the seal 72, in this embodiment, is rotated 180° from the position of the seal 72 shown in the embodiment of FIG. 2 such that the flange 76 is positioned on the top side of the seal 72. The seal 72 in FIG. 3 (as well as the other embodiments described below and shown in FIGS. 4 and 5) can also be arranged in the various other configurations and orientations, and take the form of the various seals and utilize the same materials described above in the context of FIG. 2.

Since the seal 72, in the embodiment of FIG. 3, is positioned on top of the end flange 58, instead of the below the end flange 58 (as in the embodiment of FIG. 2), the seal 72 will be compressed (instead of expand) when the arm 18 and spring case 20 move closer together (e.g. when the flange portion 64 of the bushing 40 wears). In this case, however, the seal 72/flange 76 is simply compressed and retains the desired seal.

The embodiment of FIG. 3 also utilizes a supplemental, or secondary seal 86. In this embodiment, the secondary seal is a V-ring seal 86 having a body portion 88, flange 90 and gap 92. The secondary seal 86 is sealingly positioned between the spring cap 42 and the arm 18, in a groove 94 on the underside of the spring cap 42. In the illustrated embodiment, the secondary seal 86 is positioned adjacent to the head of the fastener 32 (e.g., in one case, closer to the head of the fastener 32 than to the distal end). The secondary seal 86 of FIG. 3 can also be located in any of the four rotational positions described above for the primary seal.

The secondary seal 86 can have the same dynamic seal characteristics as the primary seal 72 described above. For example, as the spring bushing 40, or flange portion 64 of the bushing 40, wears, the axial gap between the arm 18 and spring case 24 may be reduced, thereby causing the arm 18 to move away from the spring cap 42, and the secondary seal 86 expands (i.e. its gland area increases). Thus, it can be seen that the primary 72 and secondary 86 seals, in the embodiment of FIG. 3, operate in tandem such that as one seal 72/86 expands, the other is compressed. However, it is also possible that the primary seal 72 can utilize the configuration/orientation shown in FIG. 2, in which case the primary 72 and secondary 86 seals would expand/compress in the same manner.

The secondary seal 86 blocks external contaminants from reaching the bushing 40 through any gap between the spring cap 42 and the arm 18. Thus the primary seal 72 prevents contaminants from reaching a first (upper) exposed end of the bushing 40, and the secondary seal 86 prevents contaminants from reaching a second (lower) exposed end of the bushing 40. The secondary seal 86 of FIG. 3 can also be utilized in the tensioner of FIG. 2, or in the other designs disclosed herein.

Figure 4:
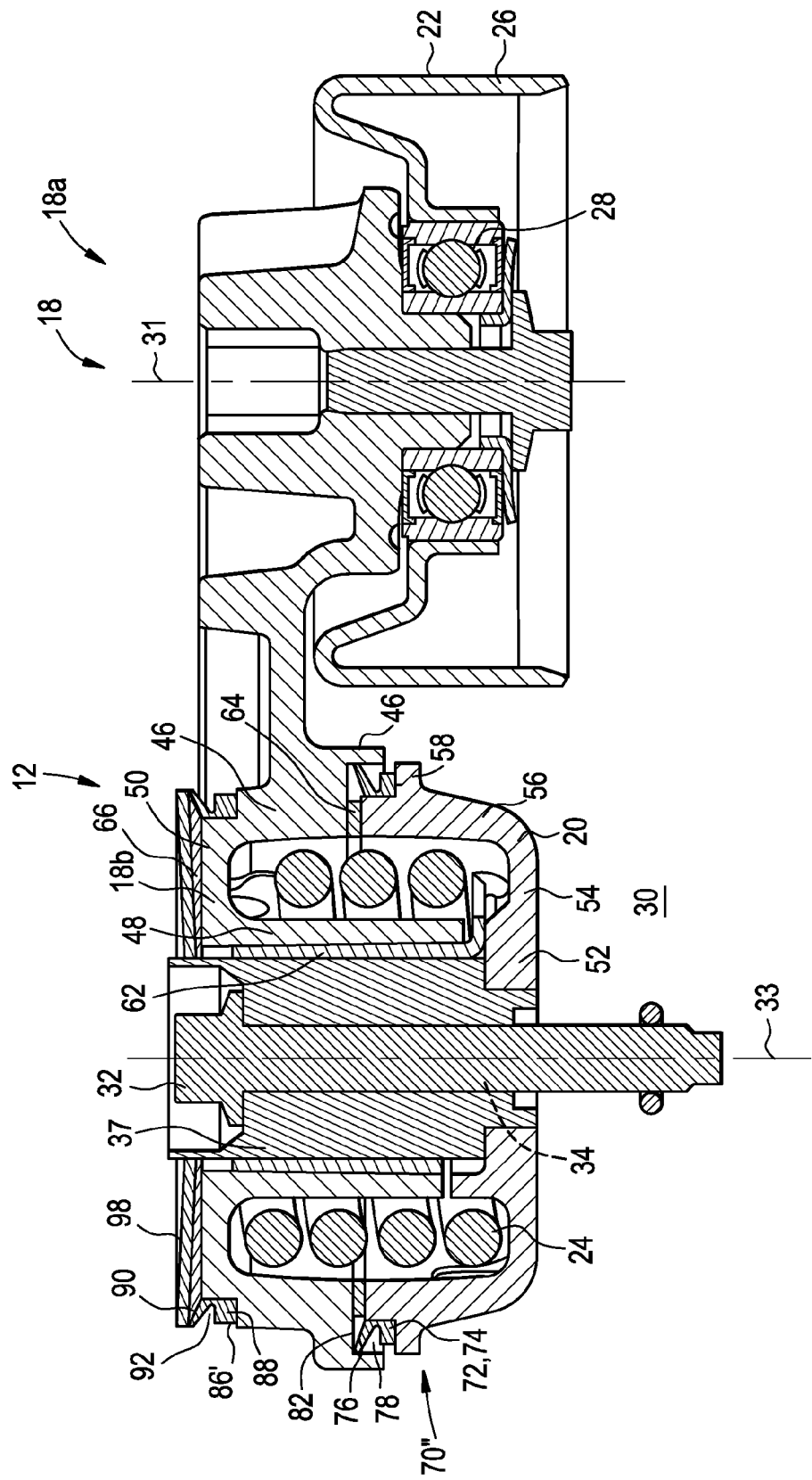
FIG. 4 is a side cross section of another alternate tensioner.

FIG. 4 illustrates another tensioner 12 which is somewhat similar in operation and principle to those of FIGS. 2 and 3, but utilizes a lower-offset design. Moreover, rather than having portions of the arm 18 and spring case 20 nest or overlap significantly in the axial direction, the arm 18 and spring case 20 meet in a planar face-to-face contact area separated by a spring bushing or flange bushing 64. The inner flange 48 of the arm 18 is positioned radially inside the spring 24, adjacent to the pivot tube 37. The tensioner 12 of FIG. 4 further includes a pivot bushing 62 between the arm 18 and the pivot tube 37, and a damper bushing 66 positioned at an axial top surface thereof. A deflected arm plate, or cover 98, is positioned on top of the damper bushing 66 to maintain the damper bushing 66 in place. In this embodiment, then, rather than having a single bushing 40 with three separate portions to provide three separate functions, three separate bushing 62, 64, 66 are provided, each bushing 62, 64, 66 providing a separate function.

The embodiment of FIG. 4 uses a seal system 70" which is similar in appearance and function to the seal system 70' disclosed in FIG. 3. In particular, the seal 72 is positioned such that the body 74 is positioned adjacent to (and above) the end flange 58 of the spring case 20, and the flange 76 of the seal 72 engages the arm 18. However, in the embodiment of FIG. 4 the seal system 70" is positioned at roughly/generally the axial midpoint of the tensioner 12 and positioned adjacent to the spring bushing 64 to fluidly isolate the spring bushing 64 and prevent contaminants from contacting the spring bushing 64.

The embodiment of FIG. 4 also utilizes a secondary seal 86', somewhat similar to the secondary seal 86 of FIG. 3. However, the secondary seal 86' of FIG. 4 is positioned between the arm 18 and the deflected arm plate 98. Moreover, the secondary seal 86' in FIG. 4 is shown rotated 180° from the position of secondary seal 86 of FIG. 3. However, the secondary seal 86' of FIG. 4 can be located in either position. The secondary seal 86' fluidly isolates and protects the damper bushing 66 from contaminants.

In the embodiment of FIG. 4, when the spring bushing 64 wears, the primary seal 72 will be further compressed (i.e. its gland area will decrease). When the damper bushing 66 wears, the secondary seal 86' will also be further compressed (i.e. its gland area will decrease).

Figure 5:
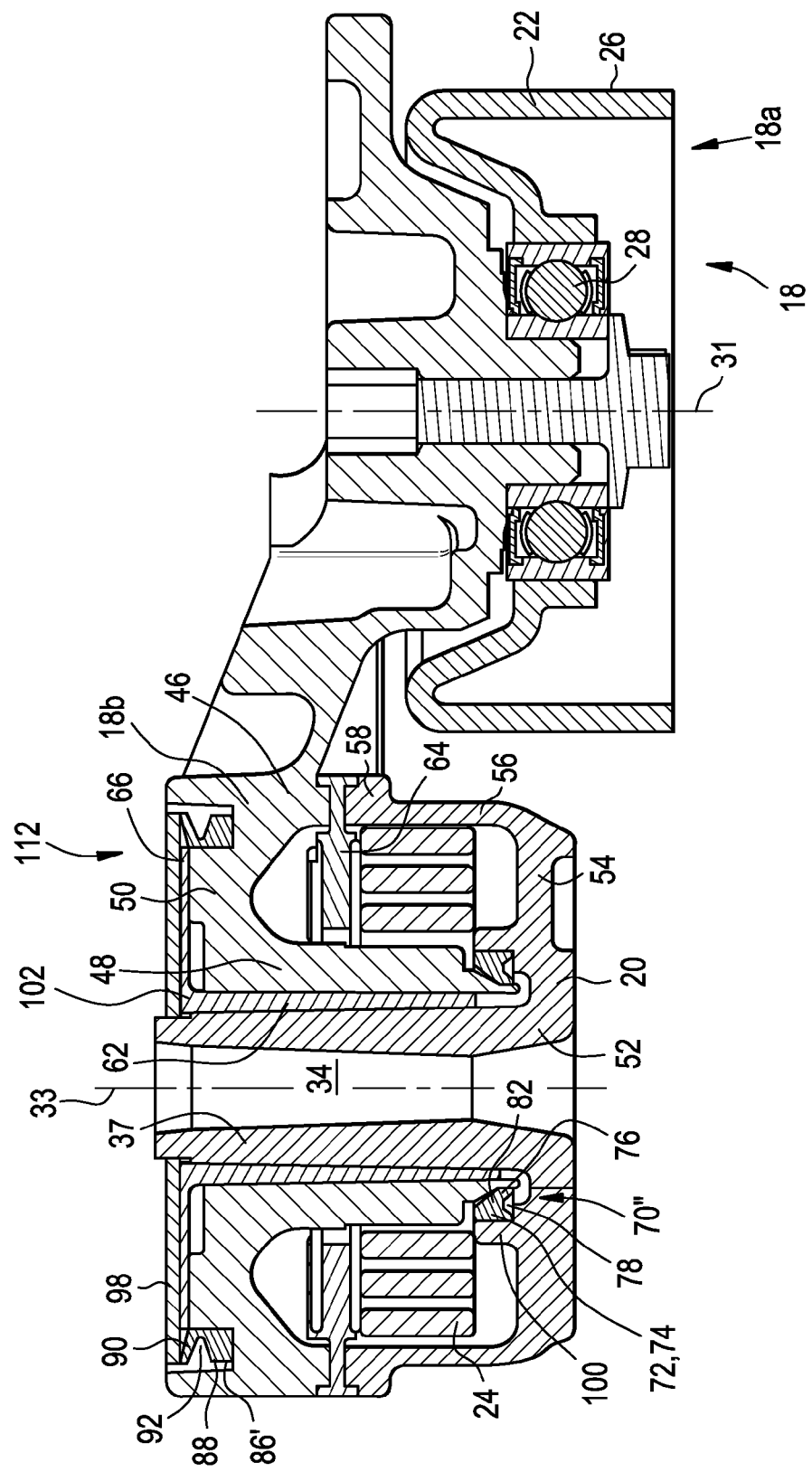
FIG. 5 is a side cross section of yet another alternate tensioner.

FIG. 5 illustrates another tensioner 12 with a moderate offset and utilizing a flat spring 24, instead of a spring with a round cross section as in FIGS. 2-4. In this embodiment the pivot tube 37 is formed as one piece with the spring case 20. The tensioner of FIG. 5 12 includes a bushing component 102 including both a cylindrical portion 62, positioned between the arm 18 and the pivot tube 37/spring case 20, and a damper portion 66, positioned between the deflected arm plate 98 and the arm 18. The tensioner 12 also includes a flange portion bushing 64 positioned between the face-to-face contact area of the arm 18 and the spring case 20, somewhat similar to the bushing 64 in the embodiment of FIG. 4.

In this embodiment, the seal 70''' is positioned at a radially inner position between the arm 18 and spring case 20, radially inside a seal stop 100 that is integral with the spring case 20. In this particular embodiment, the flat spring 24 includes an anchor hook which is positioned externally of the spring case 20, thereby making sealing of the spring case 20/tenioner 12 difficult. Accordingly, in this case, the seal 70''' is positioned radially inwardly of the spring 24, adjacent to the bushing 62, and sealingly positioned between the arm 18 and spring case 20 to seal the bushing 62.

The secondary seal 86' is positioned between the arm 18 and the deflected arm plate 98, similar to the secondary seal 86' in the embodiment of FIG. 4. However, in the embodiment of FIG. 5, the secondary seal 86' is positioned in a generally closed cavity and therefore can be located in any of the four radial positions referenced above. Thus, the primary 70''' and secondary 86' seals of FIG. 5 seal the cylindrical portion 62 and damper bushing portions 60 to ensure proper operation of the tensioner 12.

As can be seen, the various seals disclosed herein help to prevent contaminants from reaching various internal components of the tensioner, including in various cases the bushings or parts thereof, the spring, or other parts. Reducing the introduction of contaminants thereby helps to provide longer life and proper operation to the tensioner, which in turn extends the life and ensure proper operation of the belt system 10.

Having described the invention in detail and by reference to certain embodiments, it will be apparent that modifications and variations thereof are possible without departing from the scope of the invention.

What is claimed is:

1. A tensioning system comprising:
   a base;
   an arm pivotally coupled to said base, said arm having an engagement surface and being configured to pivot relative to said base about a pivot axis;
   a biasing mechanism operatively coupled to said arm to bias said arm relative to said base; and
   a seal assembly sealingly positioned between said arm and said base, wherein said seal assembly is coaxial with said pivot axis and configured to accommodate relative axial movement between said base and said arm and relative radial movement between said base and said arm while still maintaining a seal therebetween, wherein said seal assembly includes a seal body and a deflectable flange coupled to and extending axially away from said seal body, and wherein said flange is in axial compression.

2. The system of claim 1 further comprising a bushing positioned between said arm and said base, and wherein said seal assembly is positioned and configured to block external contaminants from reaching said bushing.

3. The system of claim 2 wherein said system is configured such that sufficient wear in said bushing causes at least one of relative axial movement between said base and said arm or relative radial movement between said base and said arm.

4. The system of claim 2 wherein said bushing is positioned in a sealed cavity.

5. The system of claim 1 further comprising a bushing positioned directly axially between said arm and said base, and wherein said system is configured such that sufficient wear in said bushing causes relative axial movement between said base and said arm, and wherein the seal assembly is configured to accommodate relative the axial movement between said base and said arm while still maintaining the seal therebetween.

6. The system of claim 1 wherein said seal assembly is positioned radially outside said biasing mechanism and configured to block external contaminants from reaching said biasing mechanism.

7. The system of claim 1 wherein said engagement surface is rotatable about an axis that is radially offset from said pivot axis.

8. The system of claim 1 wherein said seal assembly includes a lip seal, or a X-ring, or a U-ring extending circumferentially about said pivot axis.

9. The system of claim 1 wherein said seal is in tension in the radial direction.

10. The system of claim 1 wherein said seal assembly includes a seal with clearance on both radial sides thereof to enable said seal to move in either radial direction to accommodate said relative radial movement between said arm and said base.

11. The system of claim 1 wherein said arm includes an outer flange positioned radially outside said base, and wherein said seal assembly includes a seal positioned radially between said flange and said base.

12. The system of claim 11 wherein said arm includes a generally annular plate positioned at an axial end of said flange and aligned in a radial plane, and wherein said seal sealingly engages said plate.

13. The system of claim 11 wherein said base includes a radially-outwardly protruding end flange, wherein said seal sealingly engages said end flange, and wherein said seal is positioned between said engagement surface and said end flange in an axial direction.

14. The system of claim 11 wherein said seal assembly is positioned generally at an axial midpoint of said base.

15. The system of claim 11 wherein said arm includes a portion positioned radially inside at least part of said base, and wherein said seal assembly is entirely positioned radially between said portion and said base.

16. The system of claim 15 wherein said base includes an axially protruding stop, and wherein said seal assembly sealingly engages said stop.

17. The system of claim 1 further comprising a cover fixedly coupled to said base at an axial end thereof, and a supplemental seal assembly sealingly positioned between said arm and said cover.

18. The system of claim 17 further comprising a bushing positioned between said arm and said cover, and wherein said supplemental seal assembly is positioned and configured to block external contaminants from reaching said bushing.

19. The system of claim 17 wherein said cover is a spring cap or a deflected arm plate.

20. The system of claim 1 further comprising a bushing positioned between said arm and said base, and wherein said seal assembly is positioned and configured to block external contaminants from reaching a first exposed end of said bushing and wherein the system further includes a supplemental seal assembly positioned and configured to block external contaminants from reaching a second, opposite exposed end of said bushing.

21. The system of claim 20 wherein said system is configured such that sufficient wear in said bushing causes relative axial movement between said base and said arm, wherein said relative axial movement causes one of said seal assemblies to compress and the other one of said seal assemblies to expand.

22. The system of claim 1 further comprising a power transmitting element in the form of an endless loop, and wherein said engagement surface engages said power transmitting element as biased by said biasing mechanism to apply force to said power transmitting element and induce tension therein.

23. The system of claim 1 wherein said seal assembly includes a central axis which is aligned with said pivot axis.

24. The system of claim 1 wherein said seal assembly is configured to accommodate relative movement between said base and said arm axially away from each other while still maintaining a seal therebetween.

25. The system of claim 1 wherein said seal assembly is configured to accommodate relative axial movement between said base and said arm in a first direction axially away from each other while still maintaining a seal therebetween and wherein said seal assembly is configured to accommodate relative axial movement between said base and said arm in a second, opposite direction axially toward each other while still maintaining a seal therebetween.

26. The system of claim 1 further comprising a bushing positioned between said arm and said base, and wherein said bushing is positioned radially outside said biasing mechanism.

27. The system of claim 1 wherein said arm includes a seal counterface aligned in a radial plane, and wherein said seal sealingly engages said seal counterface.

28. The system of claim 1 wherein said axial compression constitutes compression in a direction parallel with said pivot axis.

29. The system of claim 1 wherein said seal assembly includes a seal body and a deflectable flange coupled to and extending axially away from said seal body, and wherein said flange is in axial compression.

30. The system of claim 29 wherein said base includes a surface generally aligned in a radial plane, and wherein said arm includes a surface generally aligned in a radial plane, and wherein said seal assembly engages both of said generally radially-aligned surfaces and is axially compressed between said generally radially-aligned surfaces.

31. The system of claim 30 wherein said seal body engages said base and said deflectable flange engages said arm.

32. A tensioning system comprising:
a base;
an arm pivotally coupled to said base, said arm having an engagement surface;
a biasing mechanism operatively coupled to said arm to bias said arm relative to said base;
a seal assembly sealingly positioned between said arm and said base; and
a bushing positioned axially between said arm and said base, wherein said system is configured such that sufficient wear in said bushing causes relative axial movement between said base and said arm, and wherein the seal assembly is configured to accommodate said relative axial movement between said base and said arm while still maintaining a seal therebetween and wherein said seal assembly includes a seal body and a deflectable flange coupled to and extending axially away from said seal body, and wherein said flange is in axial compression.

33. The system of claim 32 wherein said seal assembly is configured to accommodate relative movement between said base and said arm axially away from each other while still maintaining a seal therebetween.

34. The system of claim 32 wherein said bushing is positioned radially outside said biasing mechanism.

35. A tensioning system comprising:
a base;
an arm pivotally coupled to said base, said arm having an engagement surface;
a biasing mechanism operatively coupled to said arm to bias said arm relative to said base;
a bushing positioned between said arm and said base and positioned radially outside said biasing mechanism; and
a seal assembly sealingly positioned between said arm and said base, wherein the seal assembly is configured to accommodate relative axial movement between said base and said arm and relative radial movement between said base and said arm while still maintaining a seal therebetween, and wherein said seal assembly is positioned radially outside said biasing mechanism and configured to block external contaminants from reaching said biasing mechanism, and wherein said seal assembly includes a seal body and a deflectable flange coupled to and extending axially away from said seal body, and wherein said flange is in axial compression.

36. The system of claim 35 wherein said seal assembly is configured to accommodate relative movement between said base and said arm axially away from each other while still maintaining a seal therebetween.

37. The system of claim 35 wherein said bushing is positioned radially between said arm and said base.

* * * * *